United States Patent [19]
Clifford

[11] Patent Number: 5,333,596
[45] Date of Patent: Aug. 2, 1994

[54] OUTDOOR COOKING GRILL PROVIDED WITH VENDING APPARATUS

[76] Inventor: Todd W. Clifford, 6359 W. Devonshire, Cincinnati, Ohio 45140

[21] Appl. No.: 856,347

[22] Filed: Mar. 23, 1992

[51] Int. Cl.[5] .......................... A47J 37/00; F24C 3/00
[52] U.S. Cl. .............................. 126/41 R; 126/39 BA
[58] Field of Search ............... 126/39 R, 39 BA, 41 R, 126/39 G, 25 R, 42; 34/43, 53, 54

[56] References Cited

U.S. PATENT DOCUMENTS

| 3,289,801 | 12/1966 | Jerkins | 126/41 R |
| 5,003,960 | 4/1991 | Hanagan | 126/39 BA |

FOREIGN PATENT DOCUMENTS

| 213740 | 10/1985 | Japan | 126/39 BA |
| 2099607 | 12/1982 | United Kingdom | 126/39 BA |
| 2109603 | 6/1983 | United Kingdom | 126/39 BA |

Primary Examiner—James C. Yeung
Attorney, Agent, or Firm—Jeffrey S. Standley

[57] ABSTRACT

The housing includes a horizontally disposed grate which is rigidly secured to a front frame plate, opposing side walls and rear wall, all welded together. A front access door is hingedly mounted on the front frame plate and a lock is provided to secure the two together. A coin/bill acceptor and a digital display are mounted on the access door and are electrically connected to a control circuit. A solenoid-actuated shut-off valve is interposed in a gas conduit between the burner and a propane or LPG tank coupling. The shut-off valve is responsive to the control circuit which receives inputs from the coin/bill acceptor and a flame detector and which also controls a flame igniter and the digital display.

12 Claims, 5 Drawing Sheets

OUTDOOR COOKING GRILL PROVIDED WITH VENDING APPARATUS

BACKGROUND OF THE INVENTION

This invention relates to outdoor cooking grills, and more particularly to those provided with, or connected to, a source of cooking fuel.

Fuel-connected outdoor grills typically include a cooking chamber defined by relatively deep base and cover portions, one or more food positioning racks disposed between the base and the cover, a burner disposed below the positioning rack, and a source of cooking fuel. The fuel for these grills is typically natural gas from a metered house supply or propane gas or the like from a portable refillable storage tank.

While a gas grill equipped with a propane tank is technically portable, the standard size is, as a practical matter, too large to take on a picnic or camping trip without a truck or large recreational vehicle in which to transport it. As a result, most campers and picnickers must provide charcoal or wood with which to build cooking fires in rustic campground grills if they want to cook food directly over an open flame. The usual drawbacks of charcoal or wood fires, e.g., fuel replenishment and long delay before cooking, are frequently augmented by the inadequacies of public campsite grills. While some campers may find such minimal cooking amenities enjoyable, others do not. Thus, it occurred to the present inventor that the presence of fuel-connected outdoor cooking grills at campgrounds would be considered desirable by a substantial number of campers. However, due to the public nature of such facilities and the frequent unavailability or absence of attendants or authorities at these sites, there was a need to make the proposed grill vandal and theft resistant, simple, reliable and safe to operate. In addition, there was a perceived need to pass the costs of the grill and its use directly to the end user, rather than to all campers and/or the taxpaying public.

SUMMARY OF THE INVENTION

The present invention addresses the foregoing needs by improving upon a conventional outdoor cooking grill equipped with a food positioning rack, a burner disposed below the rack for distributing a flame, a conduit for conveying a cooking fuel to the burner, and a coupling for connecting the conduit to a source of cooking fuel. The improvement basically comprises the combination of an electrically actuated fuel shut off valve interposed on the conduit between the coupling and the burner, an electrical control circuit for opening and closing the valve, a money-receiving device for actuating the control circuit, a conductive member for connecting the control circuit to a source of electricity and a housing adapted to protect the aforesaid components from theft and vandalism.

A primary object of the present invention is to control the amount of and/or the length of time the cooking gas flows to the burner. Another primary object is to stop or prevent gas flow if there is no flame at the burner. Yet another object is to provide a money-receiving device for initiating operation of the present gas grill. A further object is to provide a housing that protects the grill from vandalism and theft. Further objects and advantages may be more readily understood in light of the following drawings and detailed description of the preferred embodiment.

DETAILED DESCRIPTION OF THE PREFERRED EMBODIMENT

Figure 1:
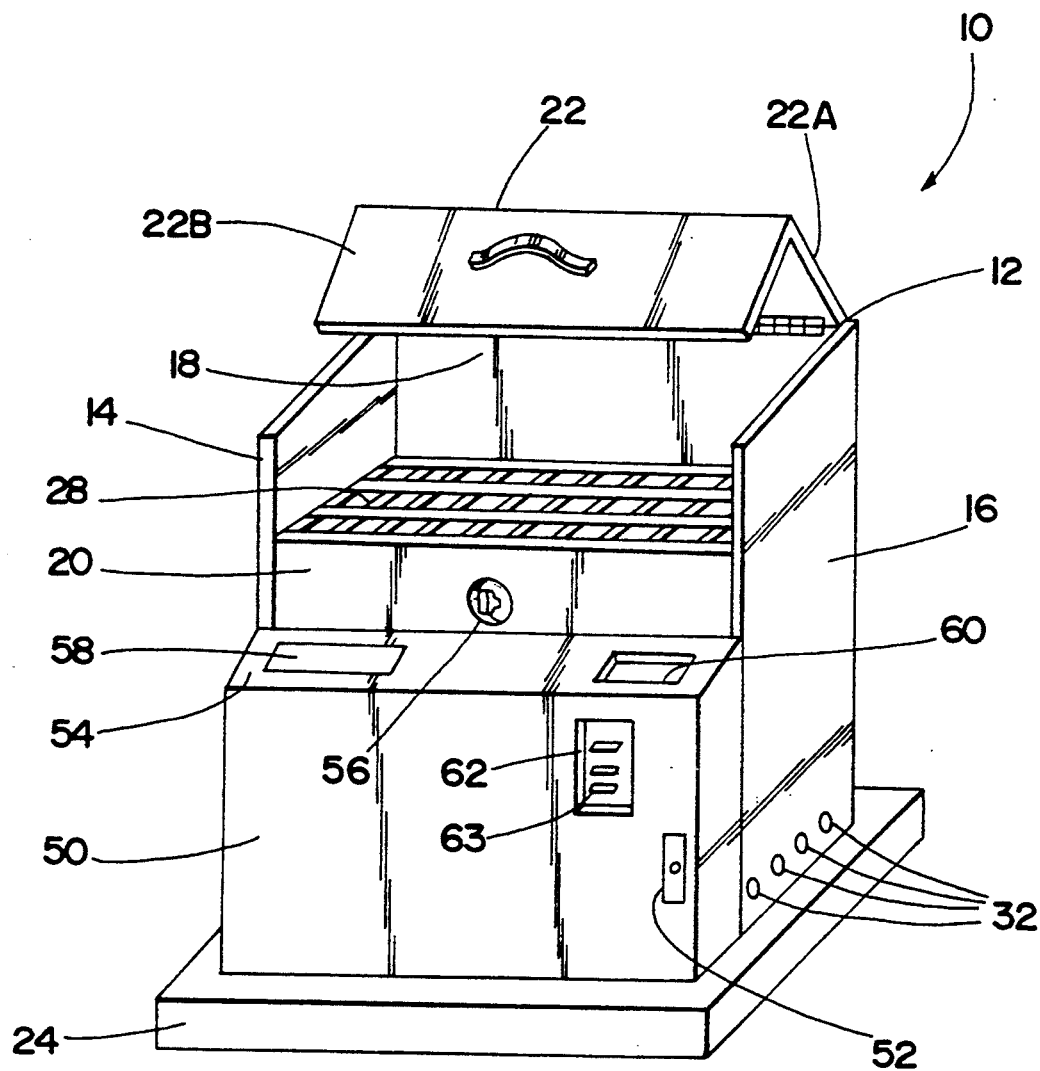
FIG. 1 is a perspective view of an outdoor grill according to the present invention.

Before one embodiment of the invention is explained in detail, it is to be understood that the invention is not limited in its application to the details of construction and the arrangement of components set forth in the following description or illustrated in the drawings. The invention is capable of other embodiments and of being practiced or carried out in various ways. Also, it should be understood that the phraseology and terminology used herein is for the purpose of description and should not be regarded as limiting.

Figure 3:
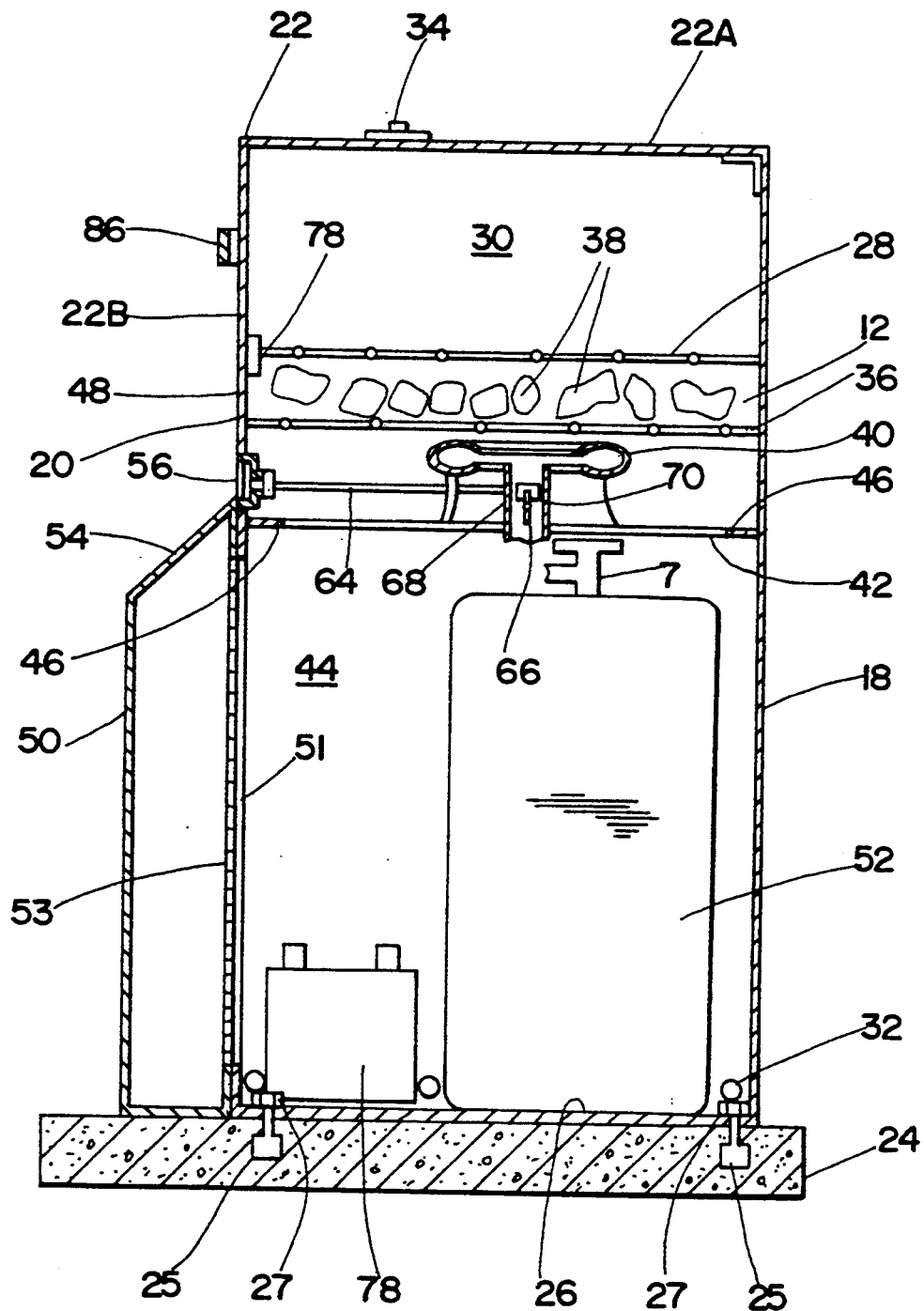
FIG. 3 is an enlarged vertical sectional view of the grill illustrated in FIG. 1.
Figure 4A:
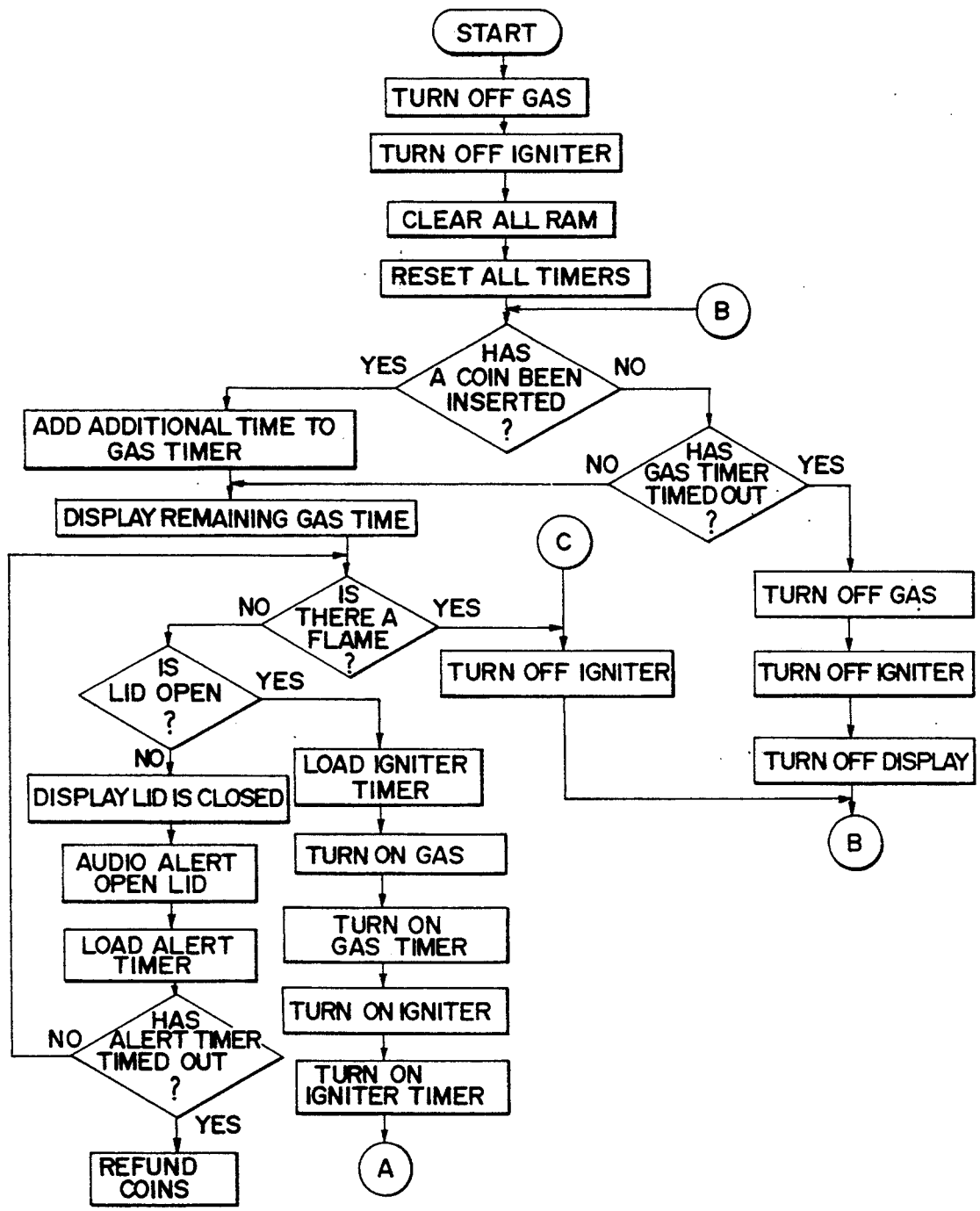
FIGS. 4A and 4B comprise a flow chart illustrating the logic sequence of the control program for the present invention.
Figure 4B:
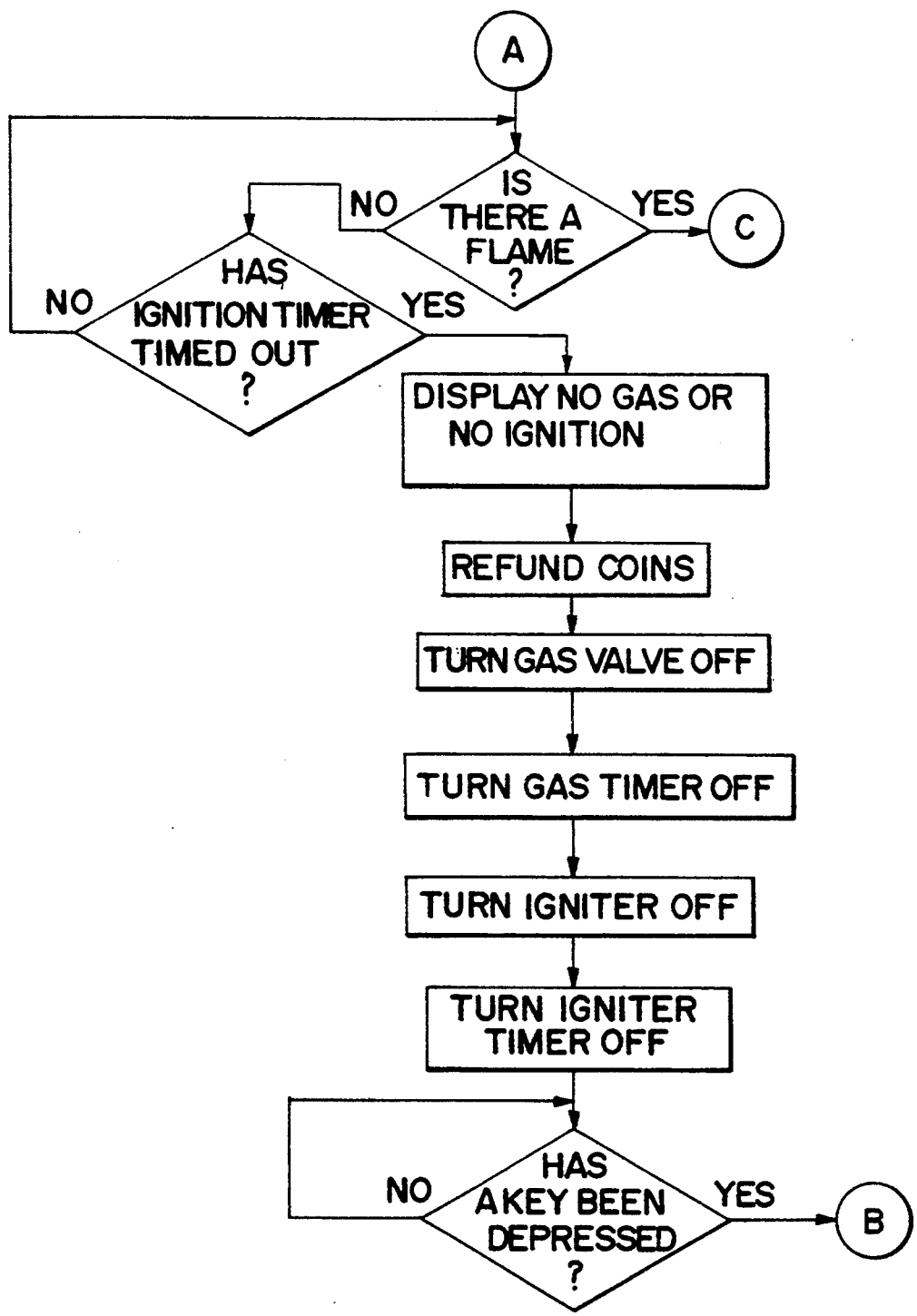

As illustrated in FIGS. 1 and 3, an outdoor grill, generally designated 10, according to the present invention is provided with a housing 12 having a pair of laterally spaced apart side walls 14,16, a rear wall 18 rigidly connected to the side walls, a relatively shorter front wall 20 and a generally L-shaped cover 22. The cover includes a rearwardly extending portion 22A hingedly connected to an upper end of the rear wall 18 and a front portion 22B disposed at approximately a right angle to the rearwardly extending portion 22A. Preferably, the housing 12 is constructed of 14 gauge galvanized steel and is mounted upon a concrete slab 24. A number of bolts 25 are partially embedded in the slab 24 and project upwardly therefrom. The threaded free ends of the bolts 25 project through bores formed in base members 26 of the housing, and nuts 27 are threadedly mounted thereon. In this manner, the housing is anchored to the slab and cannot be disconnected therefrom unless entry is gained through the steel walls of said housing. Advantageously, the side walls 14,16, rear wall 18 and front wall 20 are welded together, although it would also be possible to provide a vertically elongated angle iron at the internal corners of the housing 12 to which the various walls are welded or otherwise rigidly mounted.

Extending horizontally within the housing 12 at the level of the upper edge of the front wall 20 is a food-receiving rack 28, which is welded at perimeter edges thereof to adjoining portions of the front, side and rear walls. Alternatively, the rack 28 may be fastened to the housing 12 so as to be vertically adjustable therein. In any event, the rack 28 is securely mounted in the housing 12 so that it serves as a barrier which protects the lower components. Advantageously, the side walls 14, 16 and the rear wall 18 are taller than the front wall 20 by a distance approximately equal to the height of the front portion 22B of the cover. In this manner, a cooking chamber 24 is defined when the cover 22 is closed and, when opened, access to the food-positioning rack 28 facilitated by the relatively lower front wall 20. Air flow through the cooking chamber 30 is provided by ventilation bores 32 in the base portions of the side panels 14, 16 and by an adjustable vent 34 mounted upon the cover 22.

As illustrated in FIG. 3, the housing is also provided with a horizontally disposed grate 36 mounted below the food-receiving rack 28. The grate is preferably welded at perimeter edge portions thereof to adjoining portions of the front, side and rear walls thereby providing an additional barrier to prevent vandalism. Mounted on the grate 36 are a plurality of closely spaced, randomly arranged lava rocks, ceramic briquets or similar articles 38 adapted to be heated directly by a burner 40 disposed therebelow and to diffuse and radiate heat over a relatively large portion of the food-receiving rack 28. The housing 12 is also provided with an intermediate steel plate 42 horizontally disposed below the burner 40 and mounted along perimeter edge portions thereof to the front, side and rear walls. The intermediate plate 42 separates the cooking chamber 30 from a tank-receiving lower chamber 44 and prevents flames, hot ashes, grease and other debris from the cooking chamber 30 from entering said tank-receiving chamber 44. Preferably, the intermediate plate 42 is removably mounted in the housing to provide access to the burner 40 through the tank chamber 44. Further, the intermediate plate is provided with a plurality of openings 46 through which air may pass between the tank-receiving chamber 44 and the cooking chamber 30.

The front wall 20 includes a frame plate 48 and an access door 50 hingedly mounted upon and disposed forwardly of the frame plate 48. The frame plate 48 extends above the access door 50 and defines the rack-receiving portion of the front wall 20. That portion of the frame plate 48 which is covered by the access door 50 is formed with an enlarged opening 51 through which at least one cooking fuel tank 52 may be inserted into and removed from the tank chamber 44 of the housing. The access door 50 is preferably formed from 14 gauge galvanized steel and is pivotally mounted along one vertical edge to an adjoining portion of the frame plate 48 by means of hidden hinge members 53 of conventional design.

As indicated in FIG. 1, a lock assembly 52, typical of those found on vending machines, releasably connects the opposite side of the access door 50 to the frame plate 48. A recessed fuel flow control know 56 is mounted upon the frame plate 48 above the access door. The access door 50 includes an inclined upper surface 54 upon which are mounted a printed instruction plate 58 and a recessed display panel 60. A coin/bill acceptor and validator 62 and a change cup 63 are also mounted upon the access door 50.

As indicated in FIG. 3, a cable 64 extends from the fuel control knob 56 to a baffle 66 pivotally mounted in a gas supply pipe 68 which feeds the burner 40. An aperture 70 is provided in the gas supply pipe 68 to permit the admixture of air with the cooking gas. If desired, a control assembly (not shown) may be provided to vary the size of the air inlet 70.

Figure 2:
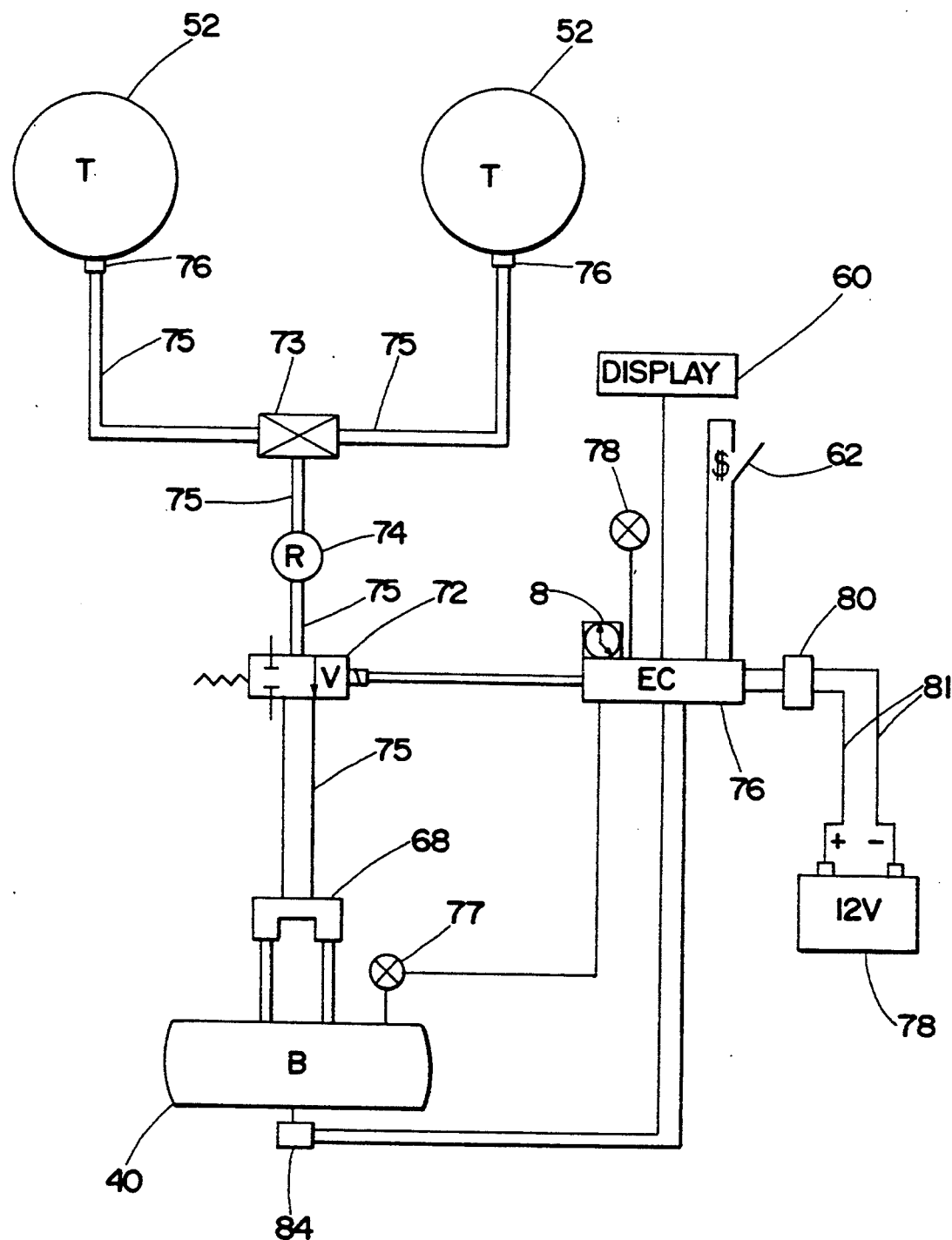
FIG. 2 is a diagrammatic view of the operative components of the present outdoor grill.

As illustrated diagrammatically in FIG. 2, the gas supply pipe 68 is connected to a solenoid-actuated valve 72 via a conduit 75. Preferably, two cooking gas tanks 52 are provided in the lower chamber 44 and are connected to a crossover valve 73 by suitable conduits 75 and couplings 76. The crossover valve 73 automatically switches to the second tank 52 when the first tank 52 is empty. A conventional flow regulator 74 is interposed between the valve 73 and the solenoid valve 72. The solenoid-actuated valve 72 is electrically connected to a circuit board 76 which houses a hard-coded program and a timer for controlling the ignition, flow of gas, safety features and visual display, as described in some detail below.

A 12-volt battery 78 is mounted at the base of the lower chamber 44 of the housing and is connected, via a conventional voltage regulator or transformer 80 and conductor 81 to the control circuit 76.

The hard-coded program of the control circuit 76 is electrically connected to the bill/coin acceptor 62, a flame detector 77 mounted adjacent to the burner 40, a lid proximity switch 78 mounted on the front wall 20 and the lid 22B adjacent to the rack 28, a timer or integral clock 82 on the circuit board 76 and the battery 78 via the voltage regulator 80 and conductor 81. The circuit board 76 is also equipped with conventional switching mechanisms for controlling the flow of current from the battery 78 to the solenoid valve 72 and to an igniter 84 adjacent to the burner 40 in response to signals from the hard-coded program. In addition, the control circuit 76 is connected to the digital display 54.

The control program for the present cooking grill 10 operates in the manner illustrated in flow chart 4A-4B. The user lifts the lid 22 by a handle 86 thereby activating the proximity switch 78, and either places the food to be cooked on the rack 28 or waits to do so until the cooking chamber 30 has reached a suitable temperature. The user then inserts a required amount of money into the acceptor/validator 62, whereupon the acceptor 62 provides a signal to the control circuit 76 which, in turn, displays the accumulated amount of money on the digital display 60. If the cover 22 is left unopened when the money is inserted, an audio alert will be emitted and a "lid closed" message will be presented on the display 60. If the user fails to open the lid within a selected period of time, the user's money will be returned.

If the lid 22 is opened prior to or shortly after inserting money, the circuit board 76 signals the solenoid valve 72 to open, and gas flows to the burner 40. Shortly thereafter, the circuit board 76 activates the igniter 84. If the detector 77 is activated by a flame on the burner 40, a signal is sent to the circuit board 76 to turn off the igniter 84. If no flame is detected, the igniter and solenoid valve 72 remain open for a selected period of time, whereupon a "no gas" or "no ignition" message is presented on the display 60 and the solenoid-actuated valve 72 is closed, the user's money is returned, and the igniter 84 is shut off. As may be readily understood, the foregoing portion of the program prevents unignited gas from continuing to flow from the tank 52 in the event that the igniter 84 fails to create a flame at the burner 40 within a selected period of time.

If a flame is created at the burner 40, the flame detector 77 signals the control circuit 76 to that effect, and the control circuit turns the igniter 84 off. The solenoid-actuated valve 72 remains open and gas continues to flow to the burner for a selected period of time which may be reset by the insertion of additional money into the bill/coin acceptor 62. During the time in which a flame is present at the burner, the user can control the size of the flame and, hence, the temperature in the cooking chamber 30 by manipulating the flow control knob 56. The butterfly valve or baffle 66 is mounted in the gas pipe 68 so that the operator can, by manipulating the control knob 56, effectively restrict or open the throat of the pipe 68 to the flow of gas, without shutting the gas off entirely. While the gas is flowing and a flame is present, the user places food on the rack 28 and can close the lid 22, if desired, without extinguishing the flame, provided the vent 34 is opened. The amount of time remaining in a given cooking cycle is displayed periodically or continuously so that the user is able to guage whether the food is properly cooked before additional money is needed. Once the cooking cycle has timed out, the control program closes the solenoid actuated shut-off valve 72 and the present grill is ready to initiate the next cooking cycle upon insertion of the required amount of money.

While a single preferred embodiment has been illustrated and described in some detail, the foregoing disclosure is not intended to limit unduly the spirit or gist of the invention, nor the scope of the following claims.

I claim:

1. In a cooking grill equipped with a food-positioning rack, a burner disposed below the rack for distributing a flame, a conduit for conveying a cooking fuel to the burner and a coupling for connecting the conduit to a source of cooking fuel, that improvement which comprises:
 a) an electrically actuated fuel shut-off valve interposed on the conduit between the coupling and the burner;
 b) a control circuit electrically connected to the fuel shut-off valve;
 c) money-receiving means electrically connected to the control circuit;
 d) connective means for electrically connecting the control circuit to a source of electricity; and
 e) a housing adapted to protect the aforesaid components from theft and vandalism.

2. The cooking grill according to claim 1, wherein a flame igniter is disposed adjacent to the burner and is electrically connected to the control circuit.

3. The cooking grill according to claim 2, wherein a flame detector is disposed adjacent to the burner and is electrically connected to the control circuit.

4. The cooking grill according to claim 3, wherein the control circuit switches the igniter off in response to a signal from the flame detector and closes the shut-off valve after a selected period of time in the absence of said signal from said flame detector.

5. The cooking grill according to claim 1, wherein the housing includes a cover, generally vertical front, side and rear walls and a generally horizontal grate extending between and rigidly secured to said walls.

6. The cooking grill according to claim 5, wherein ventilation means are provided in the cover and in the side walls of the housing.

7. The cooking grill according to claim 5, wherein the front wall includes an access door hingedly mounted on a frame plate and secured thereto by a lock, said frame plate being rigidly secured to the side walls.

8. The cooking grill according to claim 5, wherein the money-accepting means are mounted on the access door.

9. The cooking grill according to claim 5, wherein digital display means are mounted on the access door and are electrically connected to the control circuit.

10. The cooking grill according to claim 5, wherein the housing defines a fuel tank-receiving chamber disposed below the burner, said tank-receiving chamber being accessible through the access door.

11. The cooking grill according to claim 10, wherein the tank-receiving chamber is adapted to receive a source of electricity.

12. In a cooking grill equipped with a food-positioning rack, a burner disposed below the rack for distributing a flame, a conduit for conveying a cooking fuel to the burner and a coupling for connecting the conduit to a source of cooking fuel, that improvement which comprises:
 (a) an electrically actuated fuel shut-off valve interposed on the conduit between the coupling and the burner;
 (b) a control circuit electrically connected to the fuel shut-off valve;
 (c) money-receiving means electrically connected to the control circuit;
 (d) connective means for electrically connecting the control circuit to a source of electricity;
 (e) a housing adapted to protect the aforesaid components from theft and vandalism;
 (f) a manually operable fuel flow control device is mounted on the housing and is operatively connected to the conduit between the burner and the shut-off valve.

* * * * *